(12) United States Patent
Um et al.

(10) Patent No.: US 10,535,269 B2
(45) Date of Patent: Jan. 14, 2020

(54) APPARATUS AND METHOD FOR COLLISION CONTROL OF VEHICLE BASED ON BOUNDARY

(71) Applicants: HYUNDAI MOTOR COMPANY, Seoul (KR); KIA MOTORS CORPORATION, Seoul (KR)

(72) Inventors: Doo Jin Um, Seoul (KR); Na Eun Yang, Suwon-si (KR); Min Yong Shin, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 46 days.

(21) Appl. No.: 15/792,320

(22) Filed: Oct. 24, 2017

(65) Prior Publication Data

US 2018/0174462 A1 Jun. 21, 2018

(30) Foreign Application Priority Data

Dec. 16, 2016 (KR) ........................ 10-2016-0173039

(51) Int. Cl.
*G08G 1/16* (2006.01)
*B60W 30/09* (2012.01)
(Continued)

(52) U.S. Cl.
CPC ............ *G08G 1/166* (2013.01); *B60W 30/09* (2013.01); *B60W 30/0956* (2013.01);
(Continued)

(58) Field of Classification Search
CPC .. B60W 30/09; B60W 30/0956; B60W 30/12; B60W 30/18163; B60W 2550/30;
(Continued)

(56) References Cited

U.S. PATENT DOCUMENTS 8,606,479 B2 12/2013 Sekiguchi
9,235,767 B2 1/2016 Fukata et al.
(Continued)

FOREIGN PATENT DOCUMENTS

JP 2012-187979 A 10/2012
JP 2013-054614 A 3/2013
(Continued)

*Primary Examiner* — Mahmoud S Ismail
*Assistant Examiner* — Bakari Underwood
(74) *Attorney, Agent, or Firm* — MORGAN, LEWIS & BOCKIUS LLP

(57) ABSTRACT

Disclosed are a boundary-based vehicle collision control apparatus and a boundary-based vehicle collision control method. The vehicle collision control apparatus includes a driving information collection device collecting driving information comprising size information of a vehicle and environment information around the vehicle, a boundary setting device generating a reference boundary area of each of an ego vehicle and a nearby vehicle based on the size information of the vehicle and the environment information around the vehicle and variably setting the reference boundary area based on a driving state of the vehicle, a determination device determining whether the nearby vehicle enters the set boundary area, and a collision control device performing a collision avoidance control based on whether the nearby vehicle enters the set boundary area.

19 Claims, 20 Drawing Sheets

(51) Int. Cl.
  *B60W 30/12* (2006.01)
  *B60W 30/18* (2012.01)
  *B60W 50/14* (2012.01)
  *G05D 1/02* (2006.01)
  *B60W 30/095* (2012.01)

(52) U.S. Cl.
  CPC ...... *B60W 30/12* (2013.01); *B60W 30/18163* (2013.01); *B60W 50/14* (2013.01); *G05D 1/0214* (2013.01); *G05D 1/0223* (2013.01); *B60W 2550/30* (2013.01); *G05D 2201/0213* (2013.01)

(58) Field of Classification Search
  CPC .... G08G 1/166; G05D 1/0214; G05D 1/0223; G05D 2201/0213
  See application file for complete search history.

(56) References Cited

U.S. PATENT DOCUMENTS

| | | | |
|---|---|---|---|
| 2015/0025784 | A1 | 1/2015 | Kastner et al. |
| 2015/0213718 | A1 | 7/2015 | Ono |
| 2016/0339910 | A1* | 11/2016 | Jonasson ............. G05D 1/0061 |
| 2017/0199274 | A1* | 7/2017 | Sasabuchi ............ G01S 13/867 |
| 2017/0270799 | A1* | 9/2017 | Takeda ................. G08G 1/167 |
| 2018/0149743 | A1* | 5/2018 | Bialer .................. B62D 6/001 |

FOREIGN PATENT DOCUMENTS

| | | |
|---|---|---|
| JP | 5593800 B2 | 9/2014 |
| KR | 10-1251776 B1 | 4/2013 |
| KR | 10-1391606 B1 | 5/2014 |
| KR | 10-1512935 B1 | 4/2015 |

\* cited by examiner

APPARATUS AND METHOD FOR COLLISION CONTROL OF VEHICLE BASED ON BOUNDARY

CROSS-REFERENCE TO RELATED APPLICATION

This application is based on and claims the benefit of priority to Korean Patent Application No. 10-2016-0173039, filed on Dec. 16, 2016, in the Korean Intellectual Property Office, the disclosure of which is incorporated herein in its entirety by reference.

TECHNICAL FIELD

The present disclosure relates to an apparatus and a method for a boundary-based collision control of a vehicle.

BACKGROUND

An advanced driving assistance system (ADAS) performs a steering control and/or an accelerating/decelerating control depending on various driving states, such as a lane keeping driving, an evasive driving within a lane, a lane changing driving, etc.

However, since a conventional ADAS actively performs the steering control and/or the accelerating/decelerating control by a vehicle collision prediction, a driver travels with a sense of discomfort while the vehicle drives along a path.

Accordingly, there is a need to control a sensitivity caused by the steering control and/or the accelerating/decelerating control or to minimize a sense of discomfort of the driver while driving.

SUMMARY

The present disclosure has been made to solve the above-mentioned problems occurring in the prior art while advantages achieved by the prior art are maintained intact.

An aspect of the present disclosure provides an apparatus and a method for a collision control of a vehicle based on a boundary, which are capable of setting a boundary area of an ego vehicle or a nearby vehicle, variably setting the boundary area based on a driving state of the ego vehicle or the nearby vehicle, and performing a collision avoidance control to allow a detailed driving control to be capable of being performed.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a boundary-based vehicle collision control apparatus includes a driving information collection device collecting driving information including size information of a vehicle and environment information around the vehicle, a boundary setting device generating a reference boundary area of each of an ego vehicle and a nearby vehicle based on the size information of the vehicle and the environment information around the vehicle and to variably set the reference boundary area based on a driving state of the vehicle, a determination device determining whether the nearby vehicle enters the set boundary area, and a collision control device performing a collision avoidance control based on whether the nearby vehicle enters the set boundary area.

The boundary setting device sets a first boundary of the ego vehicle based on size information of the ego vehicle, sets a second boundary of the ego vehicle based on a path following performance of the ego vehicle, and sets a third boundary of the ego vehicle based on speed information of the ego vehicle.

The boundary setting device generates an area obtained by adding the first boundary, the second boundary, and the third boundary of the ego vehicle as the reference boundary area of the ego vehicle.

The boundary setting device sets a first boundary of the nearby vehicle based on size information of the nearby vehicle, sets a second boundary of the nearby vehicle based on a sensor measurement error performance of the ego vehicle, and sets a third boundary of the nearby vehicle based on relative speed information of the nearby vehicle.

The boundary setting device generates an area obtained by adding the first boundary, the second boundary, and the third boundary of the nearby vehicle as the reference boundary area of the nearby vehicle.

A longitudinal length of the reference boundary area of the ego vehicle is set equal to or smaller than two times of a minimum inter-vehicle distance control width (OAC) set in an autonomous driving system (SCC) of the vehicle.

The boundary setting device variably sets the reference boundary area of the ego vehicle or the nearby vehicle based on the driving state of the ego vehicle or the nearby vehicle when it is determined that an event for variably setting the boundary area of the ego vehicle or the nearby vehicle occurs.

The event for variably setting the boundary area of the ego vehicle includes at least one of an evasive driving event, a lane change event, a driving speed change event, or a driving lane keeping event of the ego vehicle.

The boundary setting device increases or decreases at least one of a longitudinal area or a lateral area of the reference boundary area of the ego vehicle when one of the evasive driving event, the lane change event, and the driving speed change event of the ego vehicle occurs.

The boundary setting device sets an additional boundary area to an area around the reference boundary area of the ego vehicle when the driving lane keeping event occurs.

The boundary setting device sets the additional boundary area in a lateral direction of the reference boundary area of the ego vehicle.

The event for variably setting the boundary area of the nearby vehicle includes at least one of a lateral acceleration change event, an abnormal behavior driving event, a relative speed change event, or a road attribute change event with respect to the nearby vehicle.

The boundary setting device increases or decreases at least one of a longitudinal area or a lateral area of the reference boundary area of the nearby vehicle when one of the lateral acceleration change event, the abnormal behavior driving event, the relative speed change event, or the road attribute change event occurs with respect to the nearby vehicle.

When it is determined that the nearby vehicle enters the set boundary area, the collision control device predicts a collision situation between the ego vehicle and the nearby vehicle and performs the collision avoidance control corresponding to the collision situation.

When it is determined that the nearby vehicle enters the set boundary area, the collision control device predicts a collision situation between the ego vehicle and the nearby vehicle, generates an alert message with respect to the collision situation, and outputs the alert message.

According to another aspect of the present disclosure, a boundary-based vehicle collision control method includes collecting driving information including size information of a vehicle and environment information around the vehicle, generating a reference boundary area of each of an ego vehicle and a nearby vehicle based on the size information of the vehicle and the environment information around the vehicle, variably setting the reference boundary area based on a driving state of the vehicle, determining whether the nearby vehicle enters the set boundary area, and performing a collision avoidance control based on whether the nearby vehicle enters the set boundary area.

BRIEF DESCRIPTION OF THE DRAWINGS

The above and other objects, features and advantages of the present disclosure will be more apparent from the following detailed description taken in conjunction with the accompanying drawings:

FIGS. 4A to 4J and 5 are views illustrating an operation of a boundary-based vehicle collision control apparatus according to an exemplary embodiment of the present disclosure;

DETAILED DESCRIPTION

Figure 1:
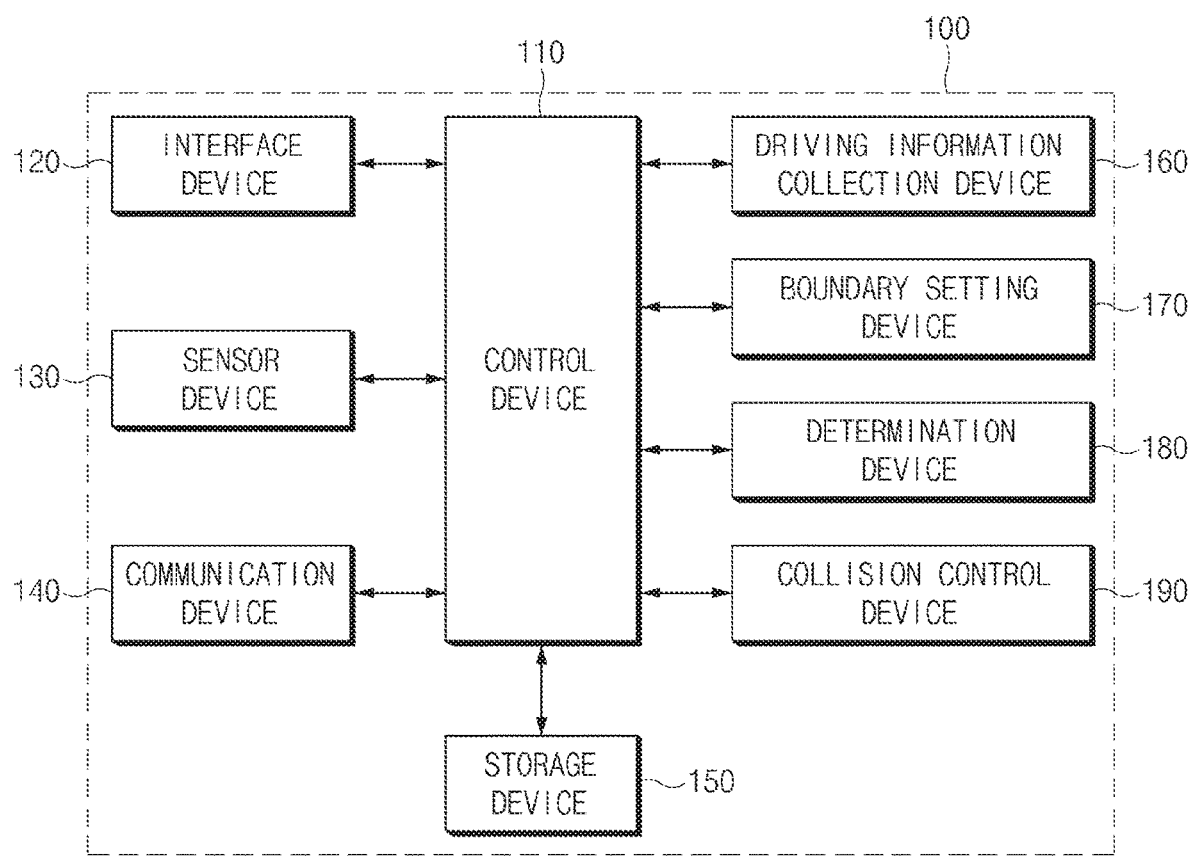
FIG. 1 is a view illustrating a configuration of a boundary-based vehicle collision control apparatus according to an exemplary embodiment of the present disclosure.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a configuration of a boundary-based vehicle collision control apparatus 100 according to an exemplary embodiment of the present disclosure.

The boundary-based vehicle collision control apparatus (hereinafter, referred to as a "collision control apparatus") 100 may be implemented in a vehicle. In this case, the collision control apparatus 100 may be integrally formed with internal control devices of the vehicle or may be connected to control devices of the vehicle by a connection device after being implemented as a separate apparatus. The collision control apparatus 100 may be operated in association with an engine and a motor of the vehicle or operated in association with a control device that controls the engine or the motor.

Referring to FIG. 1, the collision control apparatus 100 may include a control device 110, an interface device 120, a sensor device 130, a communication device 140, a storage device 150, a driving information collection device 160, a boundary setting device 170, a determination device 180, and a collision control device 190. The control device 110 may process signals transmitted between elements of the collision control apparatus 100.

The interface device 120 may include an input device to receive a control instruction from a driver and an output device to output an operation state of the collision control apparatus 100 and collision control results.

Here, the input device may include a key button, a mouse, a joystick, a jog shuttle, a stylus pen, and the like. In addition, the input device may include a soft key implemented on a display.

The output device may include the display and a voice output device, such as a speaker. In a case that a touch sensor, e.g., a touch film, a touch sheet, a touch pad, etc., is included in the display, the display may operate as a touch screen, and the input device and the output device may be implemented in an integrated form.

In this case, the display may include at least one of a liquid crystal display (LCD), a thin film transistor-liquid crystal display (TFT-LCD), an organic light-emitting diode (OLED), a flexible display, a field emission display (FED), or a three-dimensional (3D) display.

The sensor device 130 may include at least one sensor to sense vehicle information and environment information around the vehicle while the vehicle drives. The vehicle information may include size information, path following performance information, and driving speed information of the vehicle. In addition, the environment information around the vehicle may include relative position information with respect to nearby vehicles, relative speed information with respect to nearby vehicles, and road attribute information on a driving path.

As an example, the sensor device 130 may include an ultrasonic sensor, a scanner, a camera, etc. The sensor device 130 should not be limited thereto or thereby as long as the sensor may sense the vehicle information and the environment information around the vehicle.

The communication device 140 may include a communication module that supports a communication interface with electrical equipments and/or control devices included in the vehicle. For instance, the communication module may be communication-connected to a navigation installed in the vehicle and may receive the environment information around the vehicle from the navigation. The communication module may include a module supporting a vehicle network communication, such as a controller area network (CAN) communication, a local interconnect network (LIN) communication, a flex-ray communication, etc.

In addition, the communication module may receive information about the nearby vehicles via a vehicle-to-vehicle (V2V) communication with the nearby vehicles located near the vehicle. The communication module may include a module for a wireless internet access or a module for a short range communication.

As a wireless internet technology, a wireless LAN (WLAN), a wireless broadband (Wibro), a Wi-Fi, a world interoperability for microwave access (Wimax), and the like may be used, and a Bluetooth, a ZigBee, an ultra-wideband (UWB), a radio frequency identification (RFID), an infrared data association (IrDA), and the like may be used as a short range communication technology.

The storage device 150 may store data and/or algorithms required to operate the collision control apparatus 100.

The storage device 150 may store the vehicle information and the environment information around the vehicle, which are collected by the sensor device 130 and/or the communication device 140.

In addition, the storage device 150 may store boundary setting information about the vehicle or the nearby vehicles and store condition information used to increase, decrease, or add the boundary area. Further, the storage device 150 may store instructions and/or algorithms to set a boundary and to variably set the boundary area.

In the present embodiment, the storage device 150 may include a storage medium, such as a random access memory (RAM), a static RAM (SRAM), a read-only memory (ROM), a programmable ROM (PROM), an electrically erasable PROM, etc.

The driving information collection device 160 may collect the vehicle information and the environment information around the vehicle from the sensor device 130 and/or the communication device 140.

As an exemplary, the driving information collection device 160 may collect the size information, the path following performance information, and the driving speed information of the vehicle. In addition, the driving information collection device 160 may collect the environment information around the vehicle, such as the relative position information with respect to the nearby vehicles, the relative speed information with respect to the nearby vehicles, the driving path information, and the road attribute information on the driving path, etc.

The boundary setting device 170 may set the boundary with respect to an ego vehicle, i.e., the vehicle, and the nearby vehicle using the information collected by the driving information collection device 160.

First, the boundary setting device 170 may set a reference boundary of the ego vehicle using the vehicle information. The reference boundary of the ego vehicle will be described in detail with reference to FIG. 2.

Figure 2:
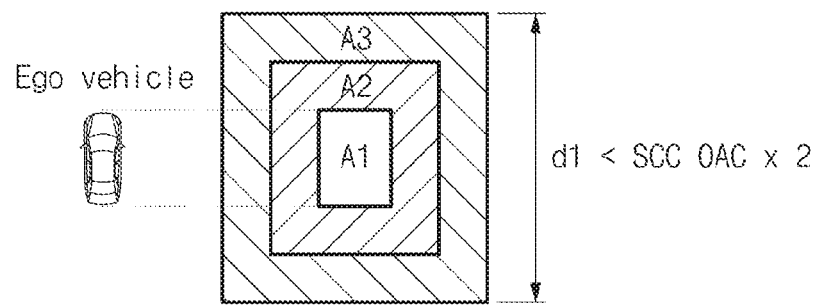
FIGS. 2 and 3 are views illustrating a boundary according to an exemplary embodiment of the present disclosure.

Referring to FIG. 2, the boundary setting device 170 may set a first boundary A1 of the ego vehicle using the size information of the ego vehicle, i.e., an overall width and an overall length of the ego vehicle. In addition, the boundary setting device 170 may set a second boundary A2 of the ego vehicle based on the path following performance of the ego vehicle.

Further, the boundary setting device 170 may set a third boundary A3 based on the speed information of the ego vehicle.

An area obtained by adding the first boundary A1, the second boundary A2, and the third boundary A3, which are set by the boundary setting device 170, may be set to a reference boundary area of the ego vehicle. Here, a longitudinal length of the reference boundary area of the ego vehicle may be set not to exceed two times of a minimum inter-vehicle distance control width of an autonomous driving system, e.g., a smart cruise control (SCC). Here, the minimum inter-vehicle distance control width may be a value set for an overtaking assist control (OAC).

The reference boundary may mean a minimum safety zone of the ego vehicle.

In addition, the boundary setting device 170 may set the boundary of the nearby vehicle using the environment information around the vehicle. In this case, when the nearby vehicle is detected within a predetermined distance from the ego vehicle, the boundary setting device 170 may set the boundary with respect to corresponding nearby vehicle.

The boundary of the nearby vehicle will be described in detail with reference to FIG. 3.

Figure 3:
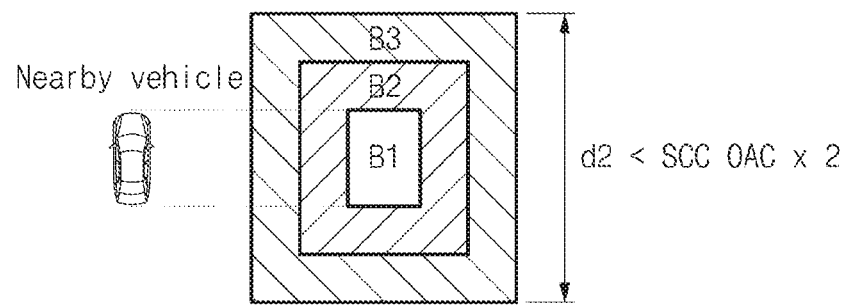

Referring to FIG. 3, the boundary setting device 170 may set a first boundary B1 of the nearby vehicle using the size information of the nearby vehicle, i.e., an overall width and an overall length of the nearby vehicle. In addition, the boundary setting device 170 may set a second boundary B2 of the nearby vehicle based on a sensor measurement error performance of the ego vehicle.

Further, the boundary setting device 170 may set a third boundary B3 based on a relative speed between the ego vehicle and the nearby vehicle.

The boundary setting device 170 may generate an area obtained by adding the first boundary B1, the second boundary B2, and the third boundary B3 as a reference boundary area of the nearby vehicle. Here, a longitudinal length of the reference boundary area of the nearby vehicle may be set not to exceed two times of the minimum inter-vehicle distance control width for the OAC of the autonomous driving system, e.g., the SCC.

The boundary setting device 170 may increase or decrease the reference boundary area of the ego vehicle and/or the reference boundary area of the nearby vehicle depending on surrounding situations.

The determination device 180 may determine whether an event for variably setting the boundary area occurs while the vehicle drives.

In the present embodiment, the event for variably setting the boundary area may include various events for the ego vehicle, such as a driving lane keeping event, an evasive driving event, a lane change event, a driving speed change event, etc., and various events for the nearby vehicle, such as a lateral acceleration change event, an abnormal behavior driving event, a relative position change event, a relative speed change event, etc., and a road attribute change event, etc.

When it is determined that the event for variably setting the boundary area occurs by the determination device 180, the boundary setting device 170 may increase or decrease the reference boundary area of the ego vehicle and/or the reference boundary area of the nearby vehicle. In addition, when it is determined that the event for variably setting the boundary area occurs, the boundary setting device 170 may set an additional boundary area in the reference boundary area of the ego vehicle.

The operation for variably setting the boundary area of the ego vehicle or the nearby vehicle in accordance with the event for variably setting the boundary area will be described in detail with reference to FIGS. 4A to 4J and 5.

Figure 4A:
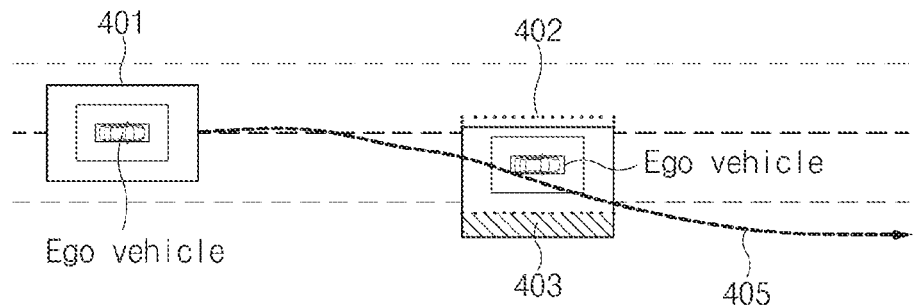
Figure 4B:
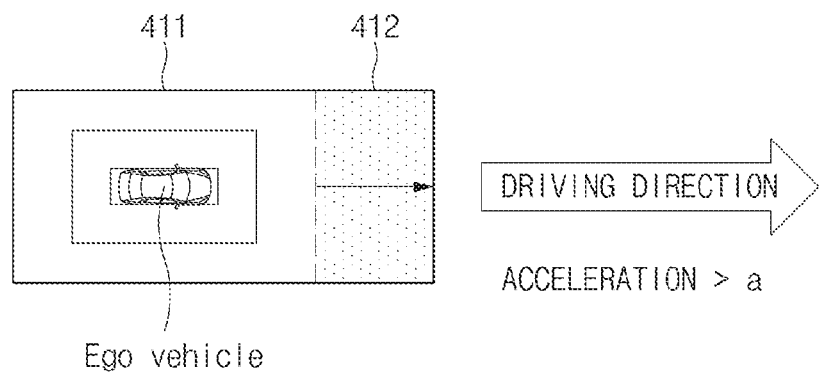
Figure 4C:
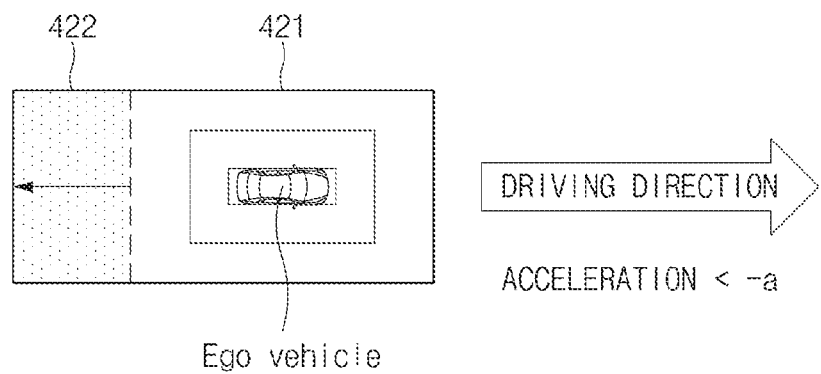

FIGS. 4A to 4C show embodiments of variably setting the boundary area of the ego vehicle.

FIG. 4A shows an embodiment of variably setting the boundary area of the ego vehicle in a case that the evasive driving event or the lane change event of the ego vehicle occurs. As shown in FIG. 4A, when it is determined that the evasive driving event or the lane change event of the ego vehicle occurs, the boundary setting device 170 may increase a lateral area of a reference boundary area 401 of the ego vehicle. In this case, the boundary setting device 170 may increase the reference boundary area in left and right directions of the ego vehicle.

In addition, the boundary setting device 170 may verify a lane change path 405. In this case, the boundary setting device 170 may increase a lateral area 403 of a lane change direction in the reference boundary area 401 of the ego vehicle and decrease a lateral area 402 of a direction opposite to the lane change direction.

As an example, in a case that the lane change direction is a right direction, the boundary setting device 170 may increase a right lateral area of the reference boundary area 401 and decrease a left lateral area of the reference boundary area 401.

FIGS. 4B and 4C show embodiments of variably setting the boundary area of the ego vehicle in a case that the driving speed change event occurs.

As shown in FIGS. 4B and 4C, when it is determined that a driving speed acceleration event or a driving speed deceleration event of the ego vehicle occurs, the boundary setting device 170 may increase a longitudinal area of reference boundary areas 411 and 421 of the ego vehicle.

Here, the driving speed acceleration event means an event occurring when an acceleration speed exceeds a predetermined critical value (a) due to a rapid acceleration of the ego vehicle. In this case, when the driving speed acceleration event of the ego vehicle occurs, the boundary setting device 170 may increase a front area 412 of the longitudinal area of the reference boundary area 411 of the ego vehicle as shown in FIG. 4B.

In addition, the driving speed deceleration event means an event occurring when the acceleration speed becomes smaller than the predetermined critical value (−a) due to a rapid deceleration of the ego vehicle. When the driving speed deceleration event of the ego vehicle occurs, the boundary setting device 170 may increase a rear area 422 of the longitudinal area of the reference boundary area 421 of the ego vehicle as shown in FIG. 4C.

Meanwhile, FIGS. 4D to 4J show embodiments of variably setting the boundary area of the nearby vehicle.

Figure 4D:
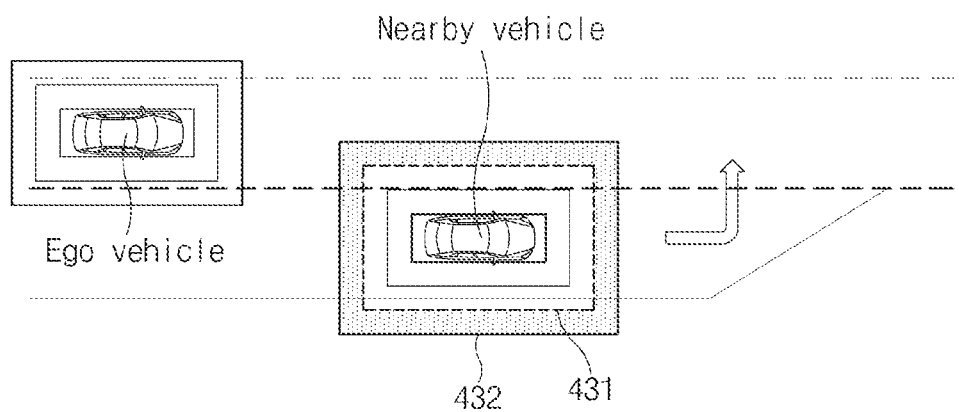

FIG. 4D shows an embodiment of variably setting the boundary area of the nearby vehicle in a case where the road attribute change event occurs.

When it is determined that the road attribute change event occurs since a lane next to an ego-vehicle driving lane disappears, the boundary setting device 170 may increase a longitudinal and lateral area 432 of a reference boundary area 431 of the nearby vehicle as shown in FIG. 4D in preparation for a lane change of the nearby vehicle driving in the lane next to the ego vehicle driving lane.

Figure 4E:
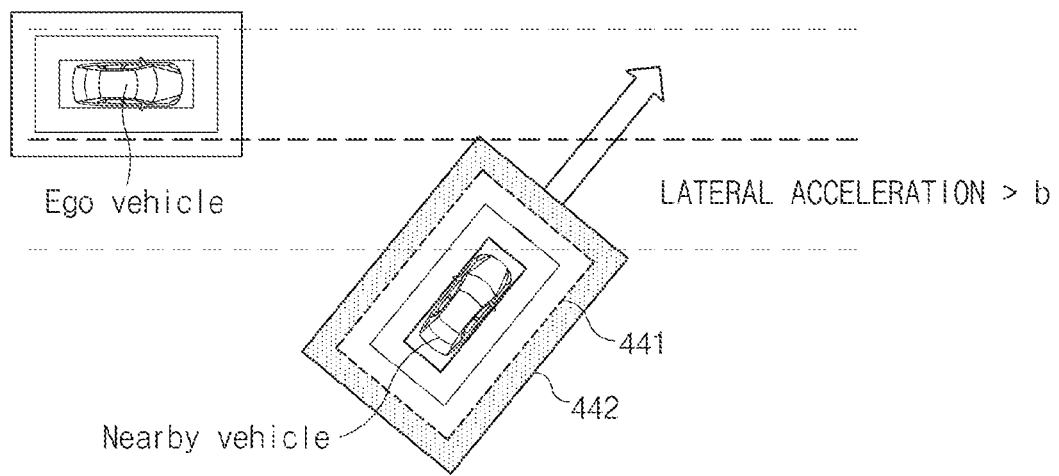

FIG. 4E shows an embodiment of variably setting the boundary area of the nearby vehicle in a case where the lateral acceleration change event of the nearby vehicle occurs.

The lateral acceleration change event means an event occurring when the lateral acceleration of the nearby vehicle driving in the lane next to the ego vehicle exceeds a predetermined critical value (b). When it is determined that the lateral acceleration change event occurs, the boundary setting device 170 may increase a longitudinal and lateral area 442 of a reference boundary area 441 of the nearby vehicle as shown in FIG. 4E to prepare for a collision with the nearby vehicle.

Figure 4F:
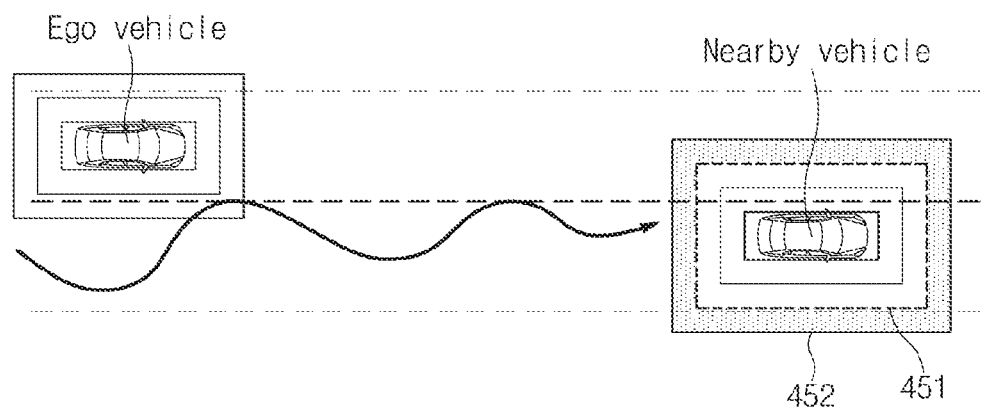

FIG. 4F shows an embodiment of variably setting the boundary area of the nearby vehicle in a case where the abnormal behavior driving event occurs in the nearby vehicle.

When it is determined that the abnormal behavior driving event occurs in the nearby vehicle traveling in the lane next to the ego vehicle, the boundary setting device 170 may increase a longitudinal and lateral area 452 of a reference boundary area 451 of the nearby vehicle as shown in FIG. 4F to prepare for a collision with the nearby vehicle.

FIGS. 4G to 4J show embodiments of variably setting the boundary area of the nearby vehicle in a case where the relative position change event and the relative speed change event occur between the ego vehicle and the nearby vehicle.

As shown in FIGS. 4G to 4J, when it is determined that a relative speed increase event or a relative speed decrease event of the nearby vehicle occurs, the boundary setting device 170 may increase or decrease a longitudinal and lateral area of each of reference boundary areas 461, 471, 481, and 491.

Figure 4G:
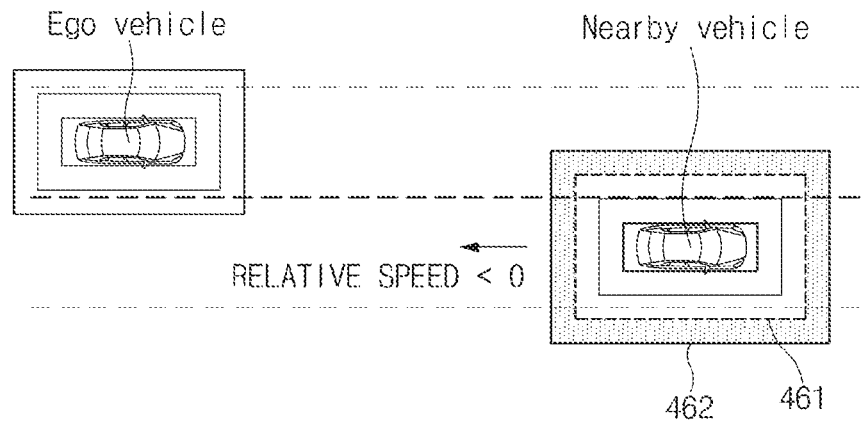

FIG. 4G shows an embodiment of variably setting the boundary area of the nearby vehicle, e.g., a vehicle traveling in front of the ego vehicle (hereinafter, referred to as a front vehicle), when the relative speed decrease event occurs in the front vehicle.

When it is determined that the relative speed decrease event occurs in the front vehicle, the boundary setting device 170 may predict the collision between the ego vehicle and the front vehicle since a distance between the ego vehicle and the front vehicle decreases. Accordingly, the boundary setting device 170 may increase a longitudinal and lateral area 462 of the reference boundary area 461 of the nearby vehicle, i.e., the front vehicle, as shown in FIG. 4G to prepare for the collision with the front vehicle.

Figure 4H:
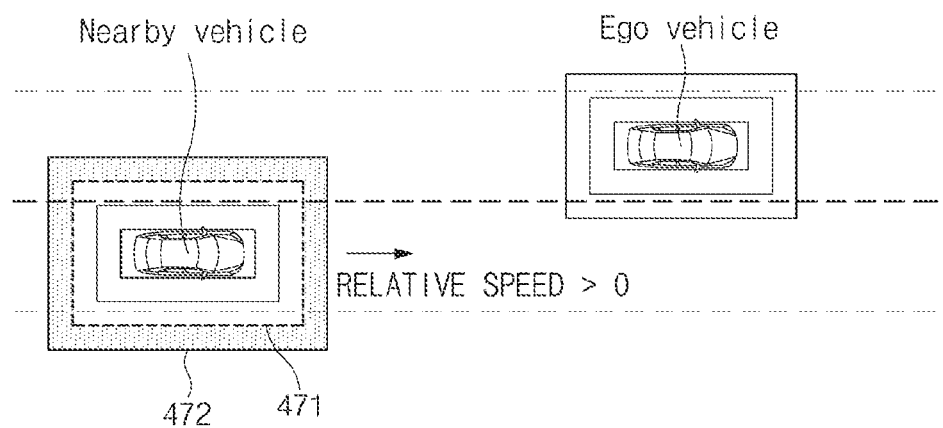
Figure 41:
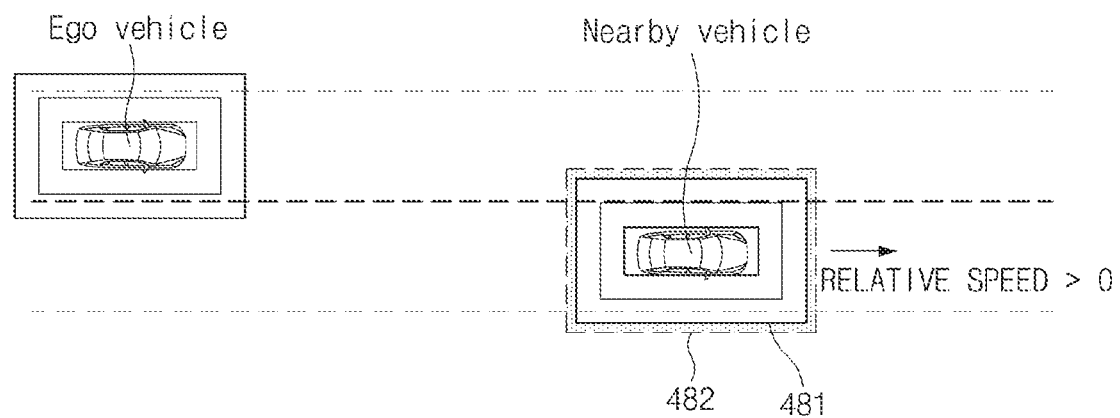

FIG. 4H shows an embodiment of variably setting the boundary area of the nearby vehicle, e.g., a vehicle traveling behind the ego vehicle (hereinafter, referred to as a rear vehicle), when the relative speed increase event occurs in the rear vehicle.

When it is determined that the relative speed increase event occurs in the rear vehicle, the boundary setting device 170 may predict the collision between the ego vehicle and the rear vehicle since a distance between the ego vehicle and the rear vehicle decreases. Accordingly, the boundary setting device 170 may increase a longitudinal and lateral area 472 of the reference boundary area 471 of the nearby vehicle, i.e., the rear vehicle, as shown in FIG. 4H to prepare for the collision with the rear vehicle.

FIG. 4I shows an embodiment of variably setting the boundary area of the nearby vehicle, e.g., a front vehicle, when the relative speed increase event occurs in the front vehicle.

When it is determined that the relative speed increase event occurs in the front vehicle, the ego vehicle may avoid the risk of collision with the front vehicle since a distance between the ego vehicle and the front vehicle increases. Accordingly, the boundary setting device 170 may decrease a longitudinal and lateral area 482 of the reference boundary area 481 of the nearby vehicle, i.e., the front vehicle, as shown in FIG. 4I.

Figure 4J:
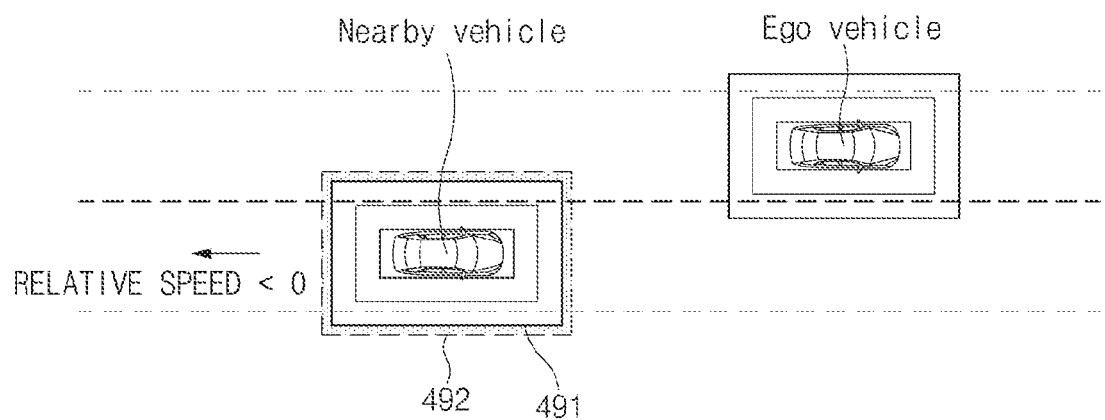

FIG. 4J shows an embodiment of variably setting the boundary area of the nearby vehicle, e.g., a rear vehicle, when the relative speed decrease event occurs in the rear vehicle.

When it is determined that the relative speed decrease event occurs in the rear vehicle, the ego vehicle may avoid the risk of collision with the rear vehicle since a distance between the ego vehicle and the rear vehicle increases. Accordingly, the boundary setting device 170 may decrease a longitudinal and lateral area 492 of the reference boundary area 491 of the nearby vehicle, i.e., the rear vehicle, as shown in FIG. 4J.

Figure 5:
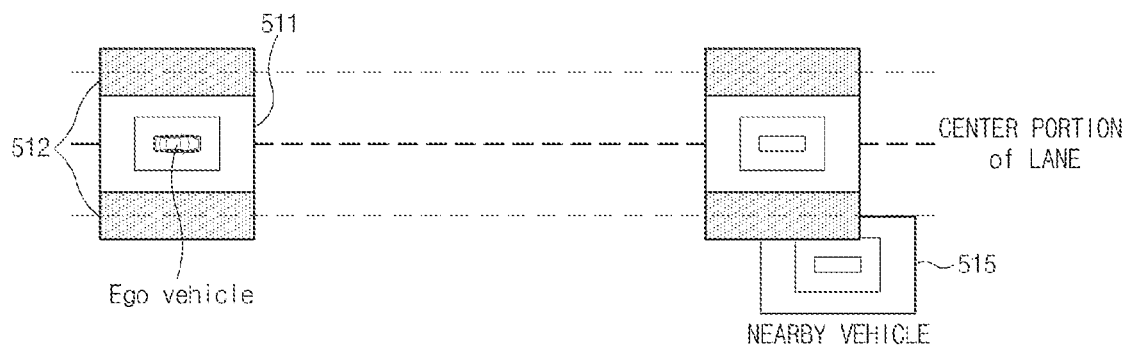

FIG. 5 shows an embodiment of setting the additional boundary area to the reference boundary area of the ego vehicle.

As shown in FIG. 5, in a case that the ego vehicle travels near a center of the driving lane or travels in the driving lane for more than a certain amount of time due to the evasive driving in the driving lane, the driving lane keeping event may occur.

As described above, when it is determined that the driving lane keeping event occurs, the boundary setting device 170 may set an additional boundary area 512 to a reference boundary area 511 of the ego vehicle to determine the sense of discomfort felt by the driver due to the nearby vehicle.

In this case, the boundary setting device 170 may set the additional boundary area 512 in the lateral direction of the reference boundary area 511 of the ego vehicle.

As shown in FIGS. 4A to 4J and 5, when the boundary area is set based on the driving state of the ego vehicle and/or the nearby vehicle, the determination device 180 may determine whether the nearby vehicle enters the set boundary area.

If it is determined that the nearby vehicle enters the boundary area of the ego vehicle, the determination device 180 may determine whether the nearby vehicle enters the reference boundary area of the ego vehicle or enters the additional boundary area.

When it is determined that the nearby vehicle enters the reference boundary area of the ego vehicle by the determination device 180, the collision control device 190 may predict the collision with the nearby vehicle. In this case, the collision control device 190 may perform a collision avoidance driving to be prepared for the collision situation. In addition, the collision control device 190 may generate a collision warning message for the collision situation and output the generated collision warning message through the output device.

Meanwhile, when it is determined that the nearby vehicle enters the additional boundary area of the ego vehicle by the determination device 180, the collision control device 190 may predict the collision with the nearby vehicle. In this case, the collision control device 190 may perform a collision avoidance driving to be prepared for the collision situation. In addition, the collision control device 190 may generate a collision warning message for the collision situation and output the generated collision warning message through the output device.

Hereinafter, the operation of the vehicle collision control apparatus having the above configuration will be described in detail.

FIGS. 6 to 10 are flowcharts illustrating a boundary-based vehicle collision control method according to an exemplary embodiment of the present disclosure.

Figure 6:
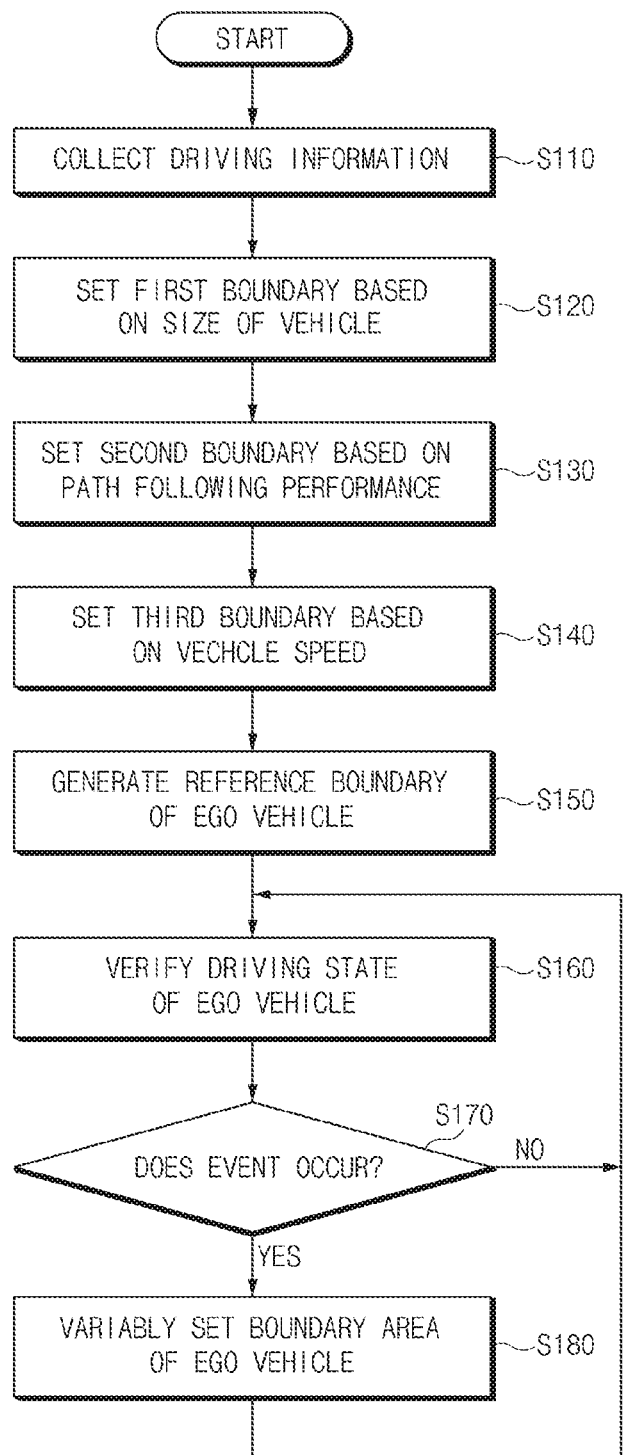
FIGS. 6 to 10 are flowcharts illustrating a boundary-based vehicle collision control method according to an exemplary embodiment of the present disclosure.
Figure 7:
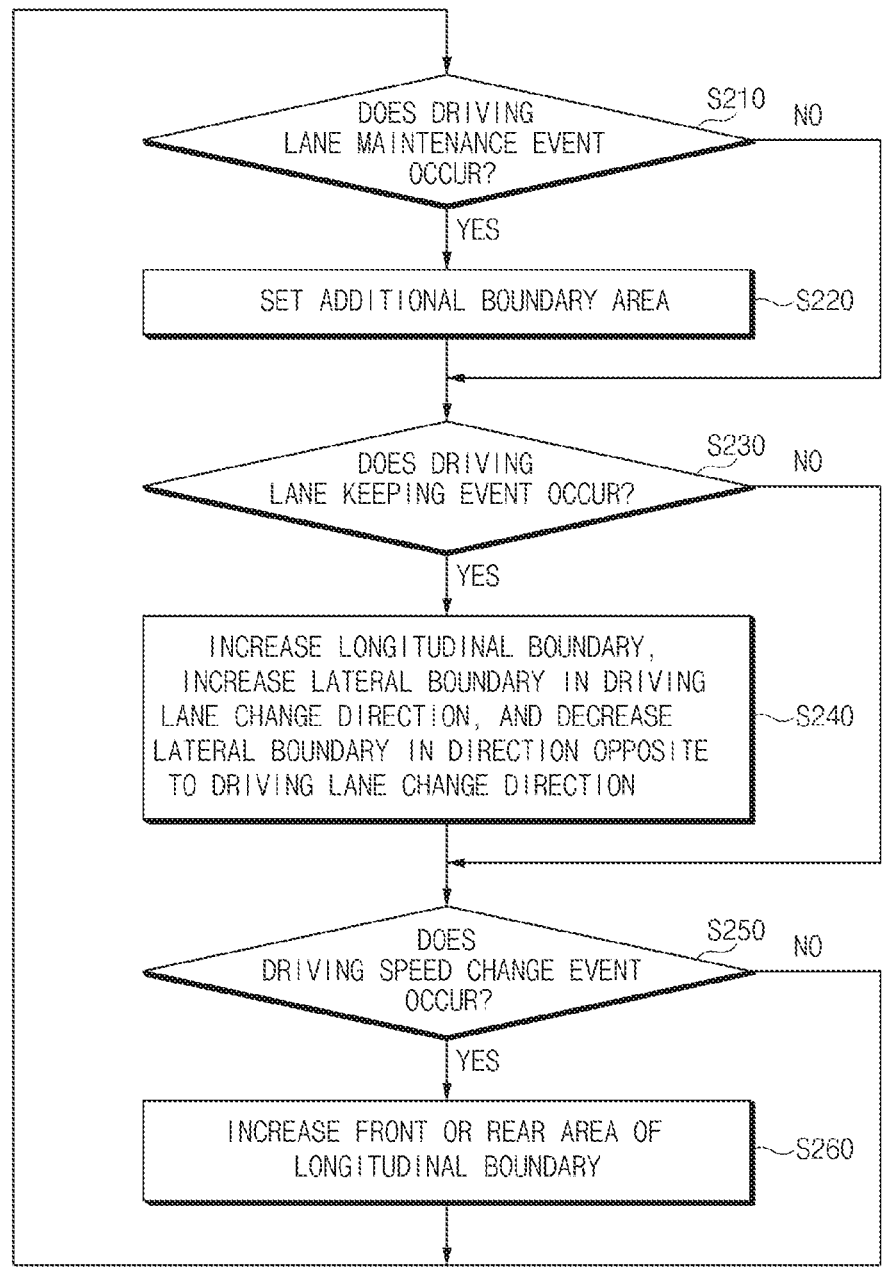

FIGS. 6 and 7 are flowcharts showing an operation of setting the boundary area of the ego vehicle.

Referring to FIGS. 6 and 7, the collision control apparatus 100 may collect the driving information of the vehicle while the vehicle drives (S110). In operation S110, the collision control apparatus 100 may collect the vehicle information, such as the size information, the path following performance information, and the driving speed information, and the environment information around the vehicle, such as the relative position information with respect to nearby vehicles, the relative speed information with respect to nearby vehicles, the driving path information, and the road attribute information on the driving path.

The collision control apparatus 100 may set the reference boundary area of the ego vehicle using the driving information of the vehicle, which are collected in operation S110 (S150).

In this case, the collision control apparatus 100 may set the first boundary A1 of the ego vehicle using the size information of the ego vehicle, i.e., the overall width and the overall length of the ego vehicle (S120). In addition, the collision control apparatus 100 may set the second boundary A2 of the ego vehicle based on the path following performance of the ego vehicle (S130) and may set the third boundary A3 based on the speed information of the ego vehicle (S140).

The collision control apparatus 100 may generate the reference boundary area of the ego vehicle from the first boundary, the second boundary, and the third boundary of the ego vehicle, which are set in operations S120 to S140 (S150).

Then, the collision control apparatus 100 may verify the driving state of the ego vehicle (S160) and determine whether the event for variably setting the boundary area of the ego vehicle occurs (S170). When it is determined that the event for variably setting the boundary area of the ego vehicle occurs in operation S170, the collision control apparatus 100 may variably set the boundary area of the ego vehicle based on the event (S180).

The operation of variably setting the boundary area based on the event occurring in operation S170 will be described in detail with reference to FIG. 7.

Referring to FIG. 7, when it is determined that the driving lane keeping event occurs since the ego vehicle drives in the driving lane for a predetermined time (S210), the collision control apparatus 100 may set the additional boundary area to the reference boundary area of the ego vehicle (S220). Here, the additional boundary area may be set as the lateral area of the reference boundary area of the ego vehicle.

In addition, when it is determined that the driving lane change event occurs (S230), the collision control apparatus 100 may increase the longitudinal area of the reference boundary area 401 of the ego vehicle, increase the lateral area of the reference boundary area of the ego vehicle in a target lane direction, and decrease the lateral area in a direction opposite to the target lane direction (S240).

In addition, when it is determined that the driving speed change event occurs (S250), the collision control apparatus 100 may increase the longitudinal area of the reference boundary area of the ego vehicle (S260). In this case, when the driving speed acceleration event occurs, the collision control apparatus 100 may increase the front area of the longitudinal area in the reference boundary area of the ego vehicle, and when the driving speed deceleration event occurs, the collision control apparatus 100 may increase the rear area of the longitudinal area in the reference boundary area of the ego vehicle.

Figure 8:
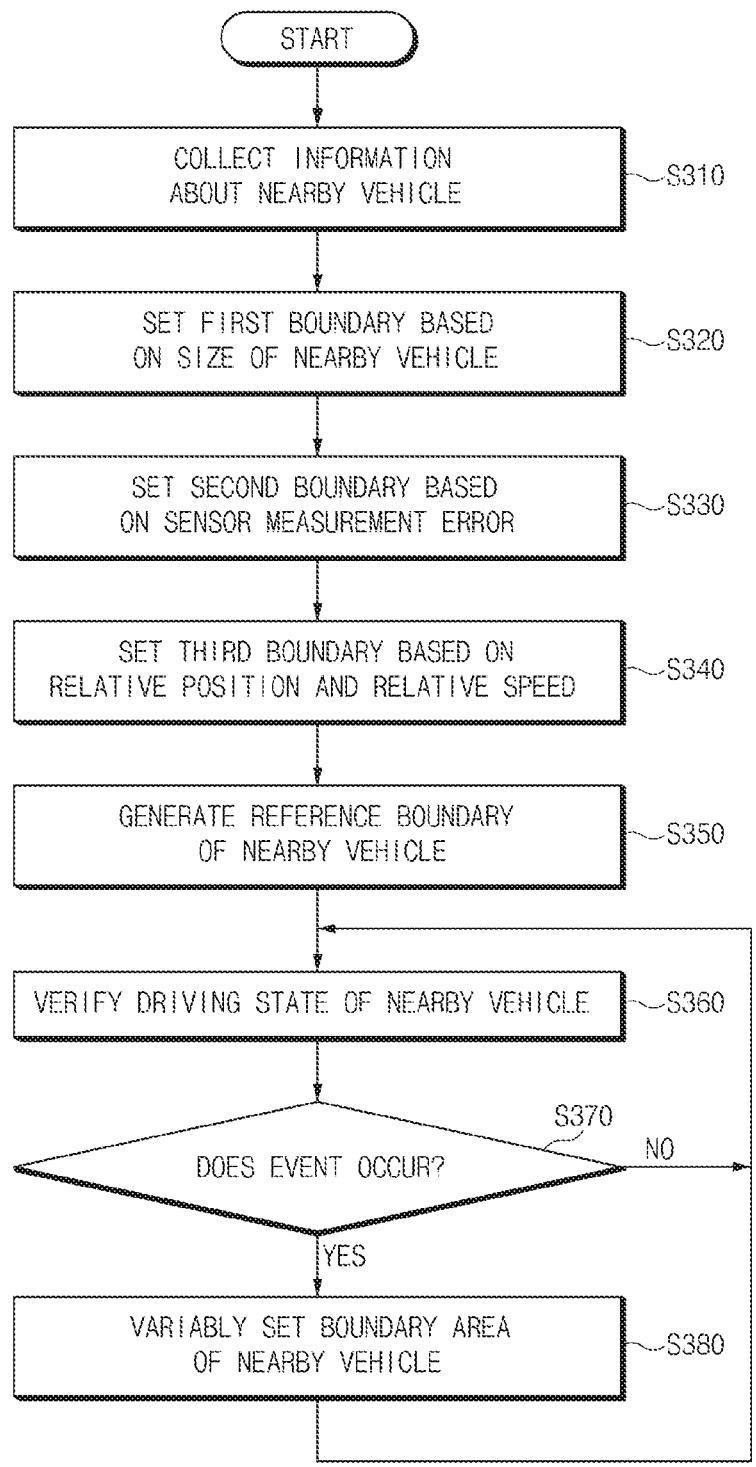
Figure 9:
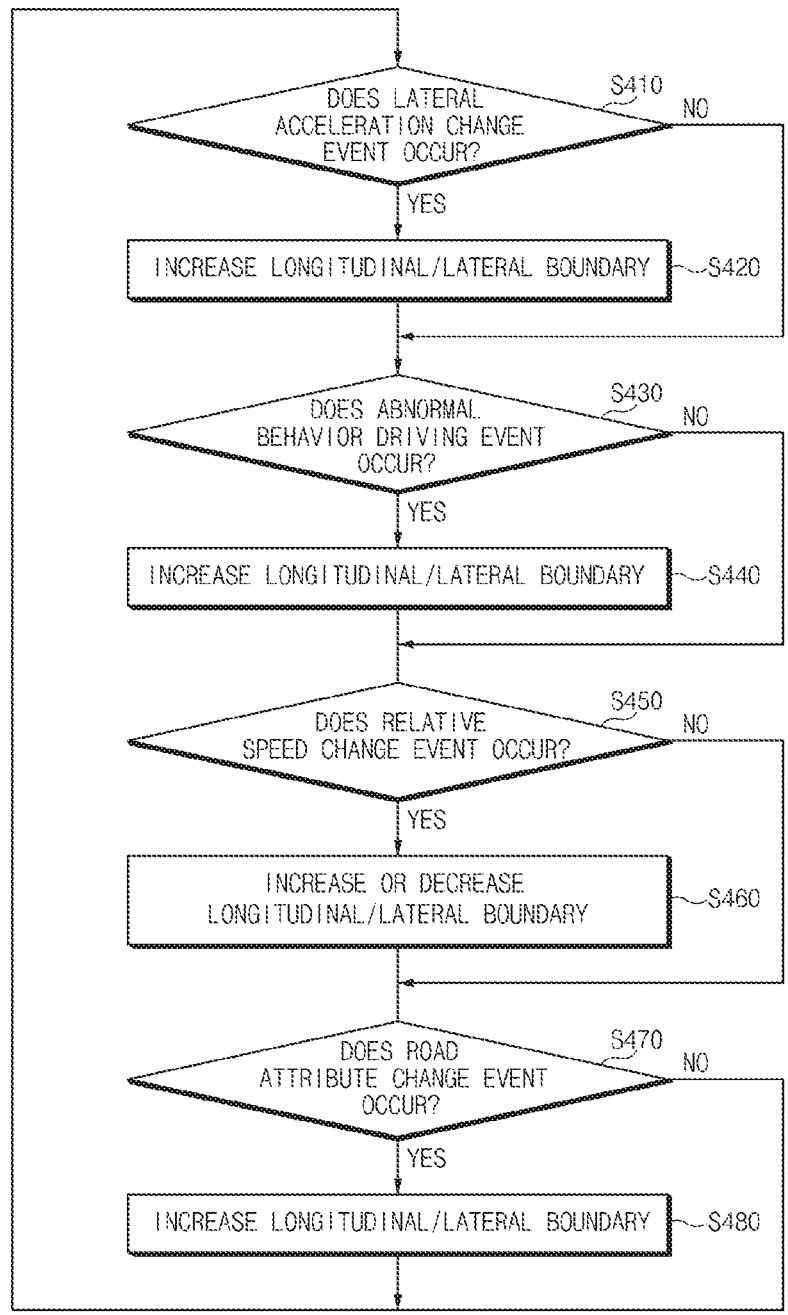

FIGS. 8 and 9 are flowcharts showing an operation of setting the boundary area of the nearby vehicle.

Referring to FIGS. 8 and 9, the collision control apparatus 100 may collect the information about the nearby vehicle while the vehicle drives (S310). In operation S310, the collision control apparatus 100 may collect the size information of the nearby vehicle, the sensor measurement error performance information, the relative position information about the nearby vehicle, and the relative speed information about the nearby vehicle.

The collision control apparatus 100 may generate the reference boundary area of the nearby vehicle using the information about the nearby vehicle, which are collected in operation S310 (S350).

In this case, the collision control apparatus 100 may set the first boundary of the nearby vehicle using the size information about the nearby vehicle, i.e., the overall width and the overall length of the nearby vehicle (S320). In addition, the collision control apparatus 100 may set the second boundary of the nearby vehicle based on the sensor measurement error performance of the ego vehicle (S330) and set the third boundary based on the relative position and speed information about the nearby vehicle (S340).

The collision control apparatus 100 may generate the reference boundary area of the nearby vehicle from the first boundary, the second boundary, and the third boundary of the nearby vehicle, which are set in operations S320 to S340.

Then, the collision control apparatus 100 may verify the driving state of the nearby vehicle (S360) and determine whether an event for variably setting the boundary area of the nearby vehicle occurs (S370). When it is determined that the event for variably setting the boundary area of the nearby vehicle occurs in operation S370, the collision control apparatus 100 may variably set the boundary area of the nearby vehicle based on the occurred event (S380).

The operation of variably setting the boundary area based on the event occurring in operation S370 will be described in detail with reference to FIG. 9.

Referring to FIG. 9, when it is determined that the lateral acceleration change event of the nearby vehicle occurs (S410), the collision control apparatus 100 may increase the longitudinal and lateral area of the reference boundary area of the nearby vehicle (S420).

In addition, when it is determined that the abnormal behavior driving event of the nearby vehicle occurs (S430), the collision control apparatus 100 may increase the longitudinal and lateral area of the reference boundary area of the nearby vehicle (S440).

Further, when it is determined that the relative speed change event of the nearby vehicle occurs (S450), the collision control apparatus 100 may increase or decrease the longitudinal and lateral area of the reference boundary area of the nearby vehicle depending on the variation in the relative speed of the front vehicle or the rear vehicle (S460).

Further, when it is determined that the road attribute change event of the lane next to the ego vehicle occurs (S470), the collision control apparatus 100 may increase the longitudinal and lateral area of the reference boundary of the nearby vehicle (S480).

Figure 10:
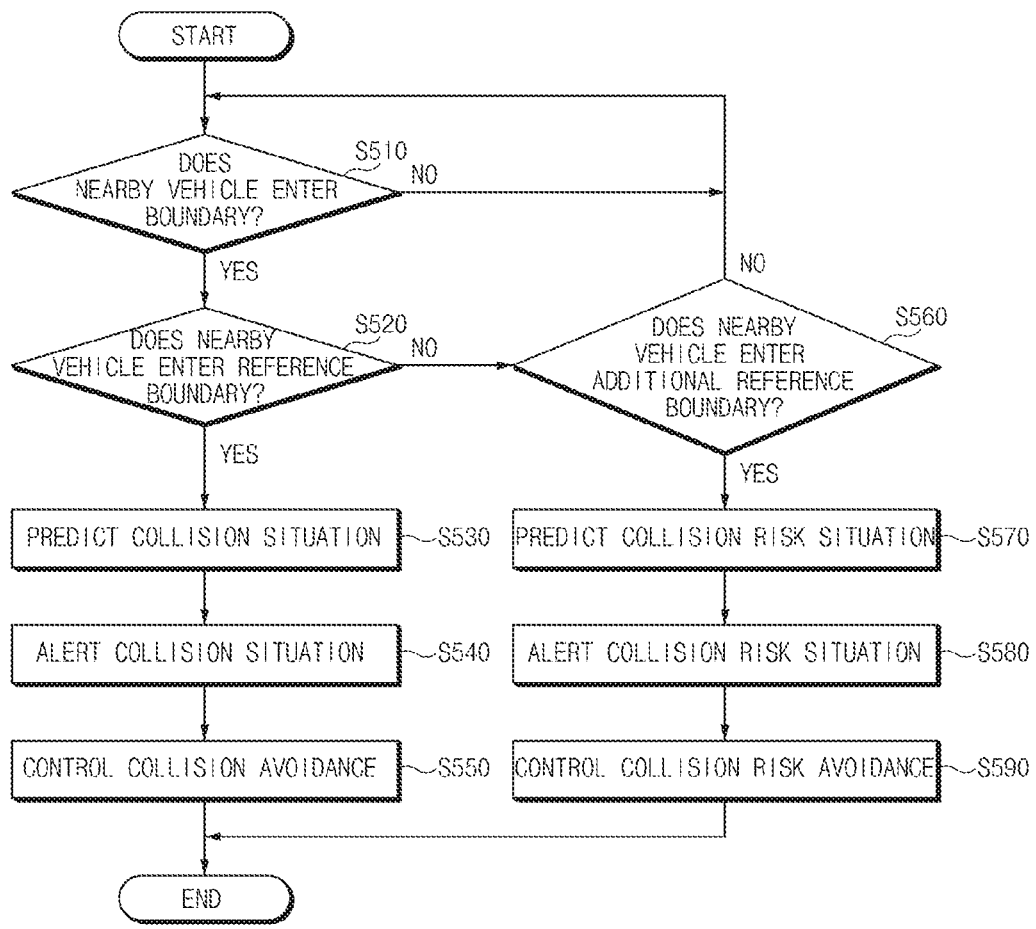

FIG. 10 is a flowchart showing a collision control operation when the nearby vehicle enters the boundary area of the ego vehicle.

As shown in FIG. 10, when the boundary area of the ego vehicle and/or the boundary area of the nearby vehicle are set by the operations shown in FIGS. 6 to 9, the collision control apparatus 100 may determine whether the nearby vehicle enters the boundary area of the ego vehicle (S510).

If it is determined that the nearby vehicle enters the boundary area of the ego vehicle in operation S510, the collision control apparatus 100 may determine that the nearby vehicle enters the reference boundary area of the ego vehicle. When it is determined that the nearby vehicle enters the reference boundary area of the ego vehicle (S520), the collision control apparatus 100 may predict the collision situation between the ego vehicle and the nearby vehicle (S530). In this case, the collision control apparatus 100 may alert the driver of the collision situation (S540) and perform the collision avoidance control to prepare for the collision situation (S550).

Meanwhile, when it is determined that the nearby vehicle does not enter the reference boundary area of the ego vehicle in operation S520, the collision control apparatus 100 may determine that the nearby vehicle enters the additional boundary area.

When it is determined that the nearby vehicle enters the additional boundary area of the ego vehicle (S560), the collision control apparatus 100 may predict the collision risk situation between the ego vehicle and the nearby vehicle (S570). In this case, the collision control apparatus 100 may alert the driver of the collision risk situation (S580) and perform the collision avoidance control to prepare for the collision risk situation (S590).

As another way, when it is determined that the nearby vehicle enters the boundary area of the ego vehicle, regardless of whether it is the reference boundary area or the additional boundary area, the collision control apparatus 100 may alert the driver of the corresponding situation and perform the collision avoidance control.

The collision control apparatus 100 operated as described above may be implemented as independent hardware or as at least one processor running on other hardware, such as a microprocessor, a general-purpose computer system, etc.

Figure 11:
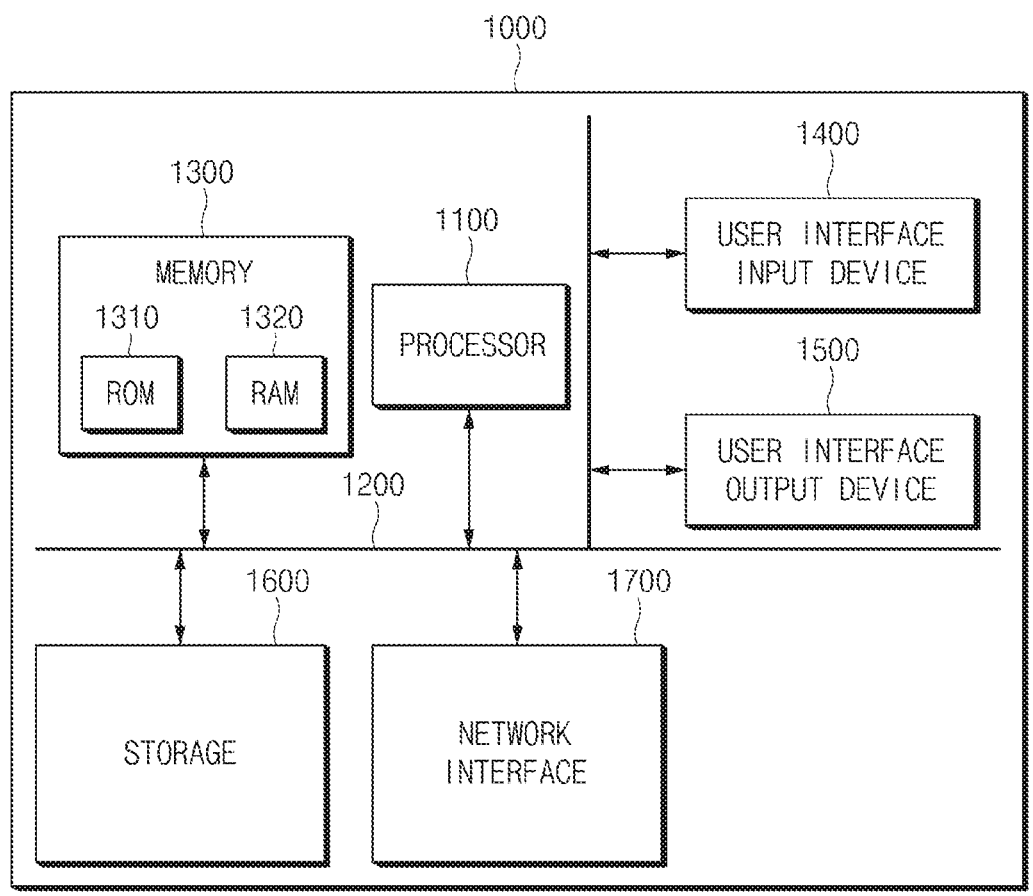
FIG. 11 is a block diagram illustrating a configuration of a computing system, to which a boundary-based vehicle collision control method is applied, according to another exemplary embodiment of the present disclosure.

FIG. 11 is a block diagram illustrating a configuration of a computing system 1000 to which a boundary-based technique for controlling the collision of the vehicle is applied, according to an exemplary embodiment of the present disclosure.

Referring to FIG. 11, the computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing device (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

According to the above, the boundary of the ego vehicle or the nearby vehicle is set, the boundary area is variably set depending on the driving state, and the collision avoidance control is performed with respect to the variably-set boundary area. Accordingly, the detailed driving control may be performed, and thus the sense of discomfort felt by the driver may be reduced.

While the present invention has been described with reference to exemplary embodiments, it will be apparent to those skilled in the art that various changes and modifications may be made without departing from the spirit and scope of the present invention.

Therefore, exemplary embodiments of the present invention are not limiting, but illustrative, and the spirit and scope of the present invention is not limited thereto. The spirit and scope of the present invention should be interpreted by the following claims, and it should be interpreted that all technical ideas which are equivalent to the present invention are included in the spirit and scope of the present invention.

What is claimed is:

1. A boundary-based vehicle collision control apparatus comprising:
a driving information collection device configured to collect driving information comprising size information of an ego vehicle and a nearby vehicle, and environment information around the ego vehicle;
a boundary setting device configured to generate a reference boundary area of each of the ego vehicle and the nearby vehicle based on the size information and the environment information, and to variably set the reference boundary area based on a driving state of the ego vehicle or the nearby vehicle;
a determination device configured to determine whether the nearby vehicle enters the set reference boundary area; and
a collision control device configured to perform a collision avoidance control based on whether the nearby vehicle enters the set reference boundary area,
wherein the reference boundary area of the ego vehicle is set based on at least one of size information, path following performance information, or speed information of the ego vehicle, and
wherein the boundary setting device is configured to:
set a first boundary of the ego vehicle based on the size information of the ego vehicle;
set a second boundary of the ego vehicle based on the path following performance information of the ego vehicle; and
set a third boundary of the ego vehicle based on the speed information of the ego vehicle.

2. The boundary-based vehicle collision control apparatus of claim 1, wherein the boundary setting device is configured to generate an area obtained by adding the first boundary, the second boundary, and the third boundary of the ego vehicle as the reference boundary area of the ego vehicle.

3. The boundary-based vehicle collision control apparatus of claim 1, wherein the boundary setting device is configured to:
set a first boundary of the nearby vehicle based on size information of the nearby vehicle;
set a second boundary of the nearby vehicle based on a sensor measurement error of a sensor device of the ego vehicle, wherein the sensor senses the environment information around the ego vehicle; and
set a third boundary of the nearby vehicle based on relative speed information of the nearby vehicle.

4. The boundary-based vehicle collision control apparatus of claim 3, wherein the boundary setting device is configured to generate an area obtained by adding the first boundary, the second boundary, and the third boundary of the nearby vehicle as the reference boundary area of the nearby vehicle.

5. The boundary-based vehicle collision control apparatus of claim 1, wherein a longitudinal length of the reference boundary area of the ego vehicle is set equal to or smaller than two times of a minimum inter-vehicle distance control width (OAC) set in an autonomous driving system (SCC) of the vehicle.

6. The boundary-based vehicle collision control apparatus of claim 1, wherein the boundary setting device is configured to variably set the reference boundary area of the ego vehicle or the nearby vehicle based on the driving state of the ego vehicle or the nearby vehicle when it is determined that an event for variably setting the boundary area of the ego vehicle or the nearby vehicle occurs.

7. The boundary-based vehicle collision control apparatus of claim 6, wherein the event for variably setting the boundary area of the ego vehicle comprises at least one of an evasive driving event, a lane change event, a driving speed change event, or a driving lane keeping event of the ego vehicle.

8. The boundary-based vehicle collision control apparatus of claim 7, wherein the boundary setting device is configured to increase or decrease at least one of a longitudinal area or a lateral area of the reference boundary area of the ego vehicle when one of the evasive driving event, the lane change event, and the driving speed change event of the ego vehicle occurs.

9. The boundary-based vehicle collision control apparatus of claim 7, wherein the boundary setting device is configured to set an additional boundary area to an area around the reference boundary area of the ego vehicle when the driving lane keeping event occurs.

10. The boundary-based vehicle collision control apparatus of claim 9, wherein the boundary setting device is configured to set the additional boundary area in a lateral direction of the reference boundary area of the ego vehicle.

11. The boundary-based vehicle collision control apparatus of claim 6, wherein the event for variably setting the boundary area of the nearby vehicle comprises at least one of a lateral acceleration change event, an abnormal behavior driving event, a relative speed change event, or a road attribute change event with respect to the nearby vehicle.

12. The boundary-based vehicle collision control apparatus of claim 11, wherein the boundary setting device is configured to increase or decrease at least one of a longitudinal area or a lateral area of the reference boundary area of the nearby vehicle when one of the lateral acceleration change event, the abnormal behavior driving event, the relative speed change event, or the road attribute change event occurs with respect to the nearby vehicle.

13. The boundary-based vehicle collision control apparatus of claim 1, wherein, when it is determined that the nearby vehicle enters the set boundary area, the collision control device is configured to:
predict a collision situation between the ego vehicle and the nearby vehicle; and
perform the collision avoidance control corresponding to the collision situation.

14. The boundary-based vehicle collision control apparatus of claim 1, wherein, when
it is determined that the nearby vehicle enters the set boundary area, the collision control device is configured to:
predict a collision situation between the ego vehicle and the nearby vehicle;

generate an alert message with respect to the collision situation; and output the alert message.

15. A boundary-based vehicle collision control method comprising:

collecting driving information comprising size information of a vehicle and environment information around the vehicle;

generating a reference boundary area of each of an ego vehicle and a nearby vehicle based on the size information of the vehicle and the environment information around the vehicle;

variably setting the reference boundary area based on a driving state of the vehicle;

determining whether the nearby vehicle enters the set boundary area; and performing a collision avoidance control based on whether the nearby vehicle enter the set boundary area, wherein the reference boundary area of the ego vehicle is set based on at least one of size information, path following performance information, or speed information of the ego vehicle, and wherein the generating a reference boundary area of each of an ego vehicle and a nearby vehicle comprises:

setting a first boundary of the ego vehicle based on the size information of the ego vehicle;

setting a second boundary of the ego vehicle based on the path following performance information of the ego vehicle; and setting a third boundary of the ego vehicle based on the speed information of the ego vehicle.

16. The method of claim 15, wherein the variably setting the reference boundary area comprises increasing or decreasing at least one of a longitudinal area or a lateral area of the reference boundary area of the ego vehicle when one of an evasive driving event, a lane change event, and a driving speed change event of the ego vehicle occurs.

17. The method of claim 15, further comprising setting an additional boundary area to an area around the reference boundary area of the ego vehicle when a driving lane keeping event of the ego vehicle occurs.

18. The method of claim 15, wherein the variably setting the reference boundary area comprises increasing or decreasing at least one of a longitudinal area or a lateral area of the reference boundary area of the nearby vehicle when one of a lateral acceleration change event, an abnormal behavior driving event, a relative speed change event, or a road attribute change event occurs with respect to the nearby vehicle.

19. The method of claim 15, wherein the performing the collision avoidance control comprises:

predicting a collision situation between the ego vehicle and the nearby vehicle when it is determined that the nearby vehicle enters the set boundary area to output an alert message in association with the collision situation; and performing the collision avoidance control corresponding to the collision situation.

* * * * *